US 6,572,044 B2

(12) United States Patent
Hitomi (10) Patent No.: US 6,572,044 B2
(45) Date of Patent: Jun. 3, 2003

(54) SPINNING REEL SPOOL (75) Inventor: Yasuhiro Hitomi, Hashimoto (JP)

(73) Assignee: Shimano Inc., Osaka (JP)

( * ) Notice: Subject to any disclaimer, the term of this patent is extended or adjusted under 35 U.S.C. 154(b) by 85 days.

(21) Appl. No.: 09/725,497

(22) Filed: Nov. 30, 2000

(65) Prior Publication Data
US 2002/0162910 A1 Nov. 7, 2002

(30) Foreign Application Priority Data

Dec. 3, 1999 (JP) ........................... 11-344317
Dec. 3, 1999 (JP) ........................... 11-344318

(51) Int. Cl.[7] .................. A01K 89/00; A01K 89/01; A01K 89/015
(52) U.S. Cl. ................. 242/322; 242/224; D22/140
(58) Field of Search .................. 242/322, 224, 242/311, 345; D22/140, 141

(56) References Cited

U.S. PATENT DOCUMENTS

| 2,712,419 | A | * | 7/1955 | Martini | 242/232 |
| 3,179,351 | A | * | 4/1965 | Ehlert | 242/224 |
| 5,149,008 | A | | 9/1992 | Oi | |
| 5,615,841 | A | * | 4/1997 | Saito | 242/231 |
| 5,697,567 | A | | 12/1997 | Sonenvald | |
| D404,461 | S | * | 1/1999 | Kaneko et al. | D22/137 |
| 5,947,400 | A | * | 9/1999 | Tsutsumi | 242/246 |
| 6,045,077 | A | * | 4/2000 | Bernard et al. | 242/314 |
| 6,164,578 | A | * | 12/2000 | Tsutsumi | 242/322 |
| 6,354,526 | B1 | * | 3/2002 | Morise | 242/295 |

FOREIGN PATENT DOCUMENTS

| AU | 44710/68 A | 4/1970 |
| JP | 2-299528 A | 11/1990 |

* cited by examiner

Primary Examiner—Emmanuel Marcelo
(74) Attorney, Agent, or Firm—Shinjyu Global IP Counselors, LLP.

(57) ABSTRACT

Spinning reel spool made lightweight overall, while maintaining the strength of its bobbin trunk and skirt. The spinning reel spool body (7) has a tubular bobbin trunk (7a), and a larger diameter skirt (7b) attached to the rear end of the bobbin trunk (7a). The bobbin trunk (7a) chiefly includes a bulkier bobbin portion (16) of synthetic polymer manufacture, and a base portion (17) formed unitarily with and on the inner peripheral side of the bobbin portion (16). The skirt (7b) is of an aluminum alloy manufacture, and is formed at lesser bulk by press-working a tubular portion (7c) and a rear flange portion (7d) unitarily.

30 Claims, 10 Drawing Sheets

SPINNING REEL SPOOL

BACKGROUND OF THE INVENTION

1. Technical Field

The present invention relates to fishing reel spools, and in particular to spinning reel spools that are reciprocative with respect to the reel body.

2. Description of Related Art

Typical spinning reels include a reel unit, a rotor, a spool, and a handle that is rotatively supported by the reel unit. The spinning-reel spool, which is reciprocative in that it shifts back and forth with respect to the reel unit, includes: a bobbin trunk onto which fishing line is wound; a front flange section disposed at the front end of, and having a larger diameter than, the bobbin trunk; and a tubular skirt provided at the rear of the bobbin trunk. The front flange section is fastened with a front-flange fixing member to the bobbin trunk.

With spools of this sort, because the bobbin trunk is routinely subjected to large forces, the bobbin trunk strength has to be kept high. On the other hand, the skirt need not be as strong as the bobbin trunk. Nevertheless, if the bobbin trunk and the skirt are to be molded unitarily by die-casting for example an aluminum alloy, the entire bobbin trunk and skirt will be formed with the same thickness, which makes the strength of the bobbin trunk and the skirt the same. This is done to prevent shrink marks, surface depressions that, due to fluctuations in thickness, sometimes occur next to thicker, heavier sections that cool more slowly than adjacent areas.

Therein, spools are known in which the bobbin trunk and the skirt are formed as separate pieces, and the tubular skirt is attached to the bobbin trunk.

With conventional spools in which the bobbin trunk and the skirt are formed unitarily, because forming the bobbin trunk with bulk to maintain its strength also makes the skirt bulky, the entire spool is made heavier. On the other hand, there are spools in which to lighten the-weight of the skirt only, this section is shaved or perforated but this entails excess cost and labor. Moreover, simply thinning their bulk risks that the bobbin trunk and skirt will deform on impact from being dropped.

The skirt is formed tubularly in conventional spools in which the bobbin trunk and the skirt are constituted as separate pieces, which diminishes the skirt's diametrical strength. Skirt strength thus diminished risks that the skirt will deform due to shock from without.

SUMMARY OF THE INVENTION

An object of the present invention is to devise overall lightness of weight for spinning reel spools and at the same time to maintain the strength of its bobbin trunk and skirt.

Another object of the present invention is to sustain the strength of the skirt in spinning reel spools in which the bobbin trunk and skirt are constituted as separate pieces.

According to a first aspect of the present invention, a spinning reel spool that can be shifted back and forth with respect to a reel unit includes a tubular bobbin trunk for winding fishing line around its circumference, and a skirt having a tubular portion with an outer diameter that is larger than the outer diameter of the bobbin trunk, and a rear flange portion that is formed unitarily with the tubular portion and attached to a rear end of the bobbin trunk.

In a spool thus, the skirt is maintained sufficiently strong, because the tubular portion and the rear flange portion are formed unitarily so that the skirt is radially strengthened by this rear flange, moreover, the bobbin trunk is formed separately from the skirt, so that a lighter weight can be attained by making the skirt thinner, i.e., to be of lesser bulk, while making the bobbin trunk thick, i.e., lending it more bulk, to maintain its strength.

According to a second aspect of the present invention, in a spool as in the first aspect, the skirt is made of a synthetic resin. The skirt is thus made lighter.

According to a third aspect of the present invention, in a spool as in the first aspect, the skirt is made of metal. The strength of the skirt is thus sustained.

According to a fourth aspect of the present invention, in a spool as in the third aspect, the skirt is made of an aluminum alloy, a stainless alloy, a titanium alloy or a magnesium alloy, using an aluminum alloy makes-metalworking the skirt easy, and enables the skirt to be made at low cost. Using a stainless alloy makes it possible to obtain a skirt having high rigidity with improved corrosion resistance. Using a titanium alloy yields a lightweight, high-rigidity skirt. Employing magnesium alloy makes the skirt even lighter.

According to a fifth aspect of the present invention, in a spool as in the third or fourth aspects, the skirt is made by press-working, die casting or forging. Forming the skirt by press-working enables it to be made thin; and the skirt can be formed readily by drawing, which is one kind of press-working, or by (metal) spinning. Producing the skirt die casting enables it to be formed readily while maintaining its strength. Forge forming the skirt imparts greater strength to the skirt.

According to a sixth aspect of the present invention, in a spool as in the fifth aspect, the tubular portion and the rear flange portion of the skirt are formed unitarily by press-working. Thus forming the skirt by press-working enables the skirt alone to be made thinner, regardless of the shape of the bobbin trunk. Consequently, it is possible to make the entire skirt lighter.

According to a seventh aspect of the present invention, in a spool as in the first aspect, the bobbin trunk is made of metal, thus to sustain its strength.

According to an eighth aspect of the present invention, in a spool as in the seventh aspect, the bobbin trunk is made of an aluminum alloy, a stainless alloy, a titanium alloy or a magnesium alloy.

Employing an aluminum alloy makes metalworking the bobbin trunk easier and enables it to be made at low cost. Using a stainless alloy yields a high-rigidity bobbin trunk having improved corrosion resistance. Using titanium alloy yields a high-rigidity, lightweight bobbin trunk. Employing magnesium alloy makes the bobbin trunk still lighter in weight.

According to a ninth aspect of the present invention, in a spool as in the eighth aspect, the bobbin trunk is made by press-working, die casting or forging. Forming the bobbin trunk by press-working enables the bobbin trunk to be made thin. The bobbin trunk can be formed readily by drawing, which is one kind of press-working, or by (metal) spinning. Die-casting the bobbin trunk enables it to be formed easily while sustaining its strength. Forging the bobbin trunk provides it greater strength.

According to a tenth aspect of the present invention, in a spool as in the first aspect, the bobbin trunk is of synthetic polymer manufacture. Lighter weight is achieved by thus making the bobbin trunk of a synthetic resin.

According to a eleventh aspect of the present invention, in a spool as in the second or tenth aspects, a finishing process is carried out on the surface of the material for the synthetic resin manufacture of the bobbin trunk. Thus by plating, for example, the surface of the synthetic resin polymer, the material can be made to look metal-like.

According to an twelfth aspect of the present invention, a spool as in the first aspect further includes a front flange portion provided at a front end of the bobbin trunk, and having a larger outer diameter than the bobbin trunk. Because a front flange portion is thus provided at the front end of the bobbin trunk, fishing line is prevented from slipping off to the front.

According to a thirteenth aspect of the present invention, in a spool as in the twelfth aspect, the front flange portion is formed unitarily with the bobbin trunk. The strength of the front flange portion is thus maintained.

According to a fourteenth aspect of the present invention, in a spool as in the twelfth aspect, the front flange portion is attached to the bobbin trunk as a separate piece. Thus, the front flange portion and the bobbin trunk can be formed as separate pieces, which makes the front flange portion detachable.

According to an fifteenth aspect of the present invention, in a spool as in the eighth to twelfth aspects, the front flange portion is made of an aluminum alloy, a stainless alloy, a titanium alloy or a magnesium alloy.

Employing an aluminum alloy makes metalworking the front flange portion easier and enables it to be made at low cost. Using a stainless alloy yields a high-rigidity front flange portion having improved corrosion resistance, using titanium alloy yields a high-rigidity, lightweight front-flange portion. Employing magnesium alloy makes the front flange portion still lighter in weight.

According to a sixteenth aspect of the present invention, in a spool as in the fifth to eleventh aspects, the front flange portion has been worked by curling. The front flange portion is thus strengthened.

According to a seventeenth aspect of the present invention, in a spool as in the first aspect, the rear flange portion further comprises an inner margin extending marginally inward of the bobbin trunk. Thus the rear flange portion is provided with an inner margin serving as the base portion of the skirt, which maintains the strength of the skirt.

According to a eighteenth aspect of the present invention, in a spool as in the seventeenth aspect, the bobbin trunk has a base portion. The strength of the bobbin trunk is thus maintained.

According to a nineteenth aspect of the present invention, in a spool as in the eighteenth aspect, the base portion of the bobbin trunk is for bonding with the inner margin of the rear flange portion. Thus, the base portion of the bobbin trunk and the inner margin of the rear flange portion serving as the base portion of the skirt bonded tightly to one another by such bonding methods as gluing or welding.

According to a twentieth aspect of the present invention, in a spool as in the first aspect, the bobbin trunk further comprises an outer margin extending marginally outward from the rear end of the bobbin trunk.

According to a twenty-first aspect of the present invention, in a spool as in the twentieth aspect, the outer margin of the bobbin trunk is for bonding to the rear flange portion.

According to a twenty-second aspect of the present invention, in a spool as in the first aspect, the bobbin trunk comprises a first bobbin section having a first base portion, and a tubular second bobbin section formed to have the same diameter as the first bobbin section and to be unitary with the skirt. Thus, the front flange portion and the second bobbin section are connected smoothly to one another unitarily, which keeps fishing line from getting stuck between the two.

According to a twenty-third aspect of the present invention,-in a spool as in the twenty-second aspect, the second bobbin section has a second base portion. The strength of the second bobbin section is thus maintained.

According to a twenty-fourth aspect of the present invention, in a spool as in the twenty-third aspect, the first base portion can be fastened to the second base portion.

According to a twenty-fifth aspect of the present invention, in a spool as in the third aspect, the skirt further comprises a folded portion in the rear portion of the tubular portion, bent over marginally inward, which thus strengthens the skirt.

According to a twenty-sixth aspect of the present invention, in a spool as in the twenty-fifth aspect, a curling process produces the folded portion. Thus by a curling process, which is a simple plastic-working procedure, the folded portion is readily formed.

According to a twenty-seventh aspect of the present invention, in a spool as in the first aspect, the skirt is provided with through-holes formed by press-working through its outer peripheral surface. The skirt is thus made even more lightweight, and the through-holes can be made at relatively low cost by press-working.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

First Embodiment

Figure 1:
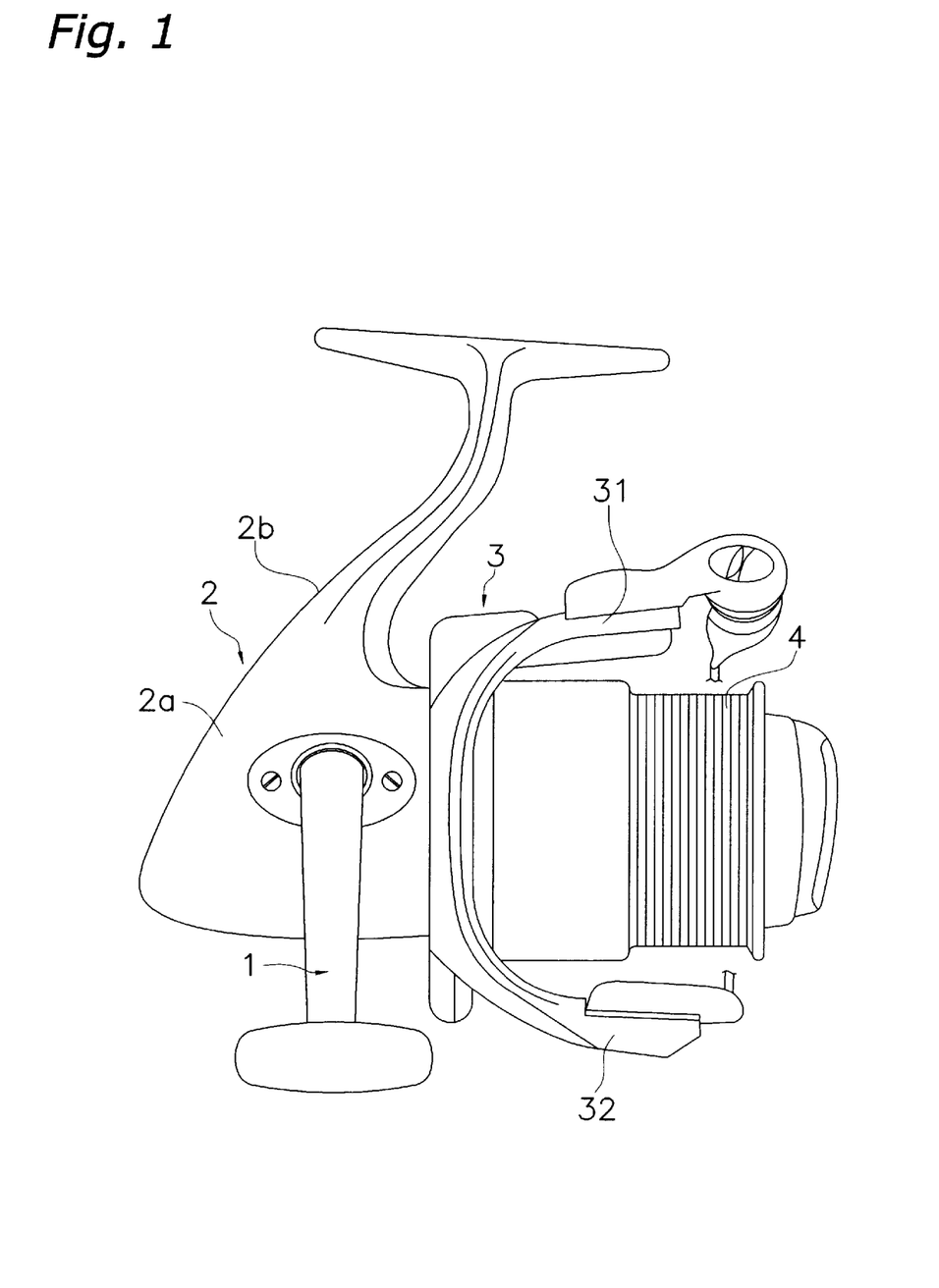
FIG. 1 is a right-side elevational view of a spinning reel in accordance with a first embodiment of the present invention.

As shown in FIG. 1, a spinning reel in accordance with a first embodiment of the present invention includes a reel body 2, a rotor 3, a spool 4, and a handle 1 that is rotatively supported by the reel body 2. The rotor 3 is rotatively supported at the front of the reel body 2. Fishing line is wound around the outer peripheral surface of the spool 4, which is disposed at the front of the rotor 3 and can be shifted back and forth.

Figure 2:
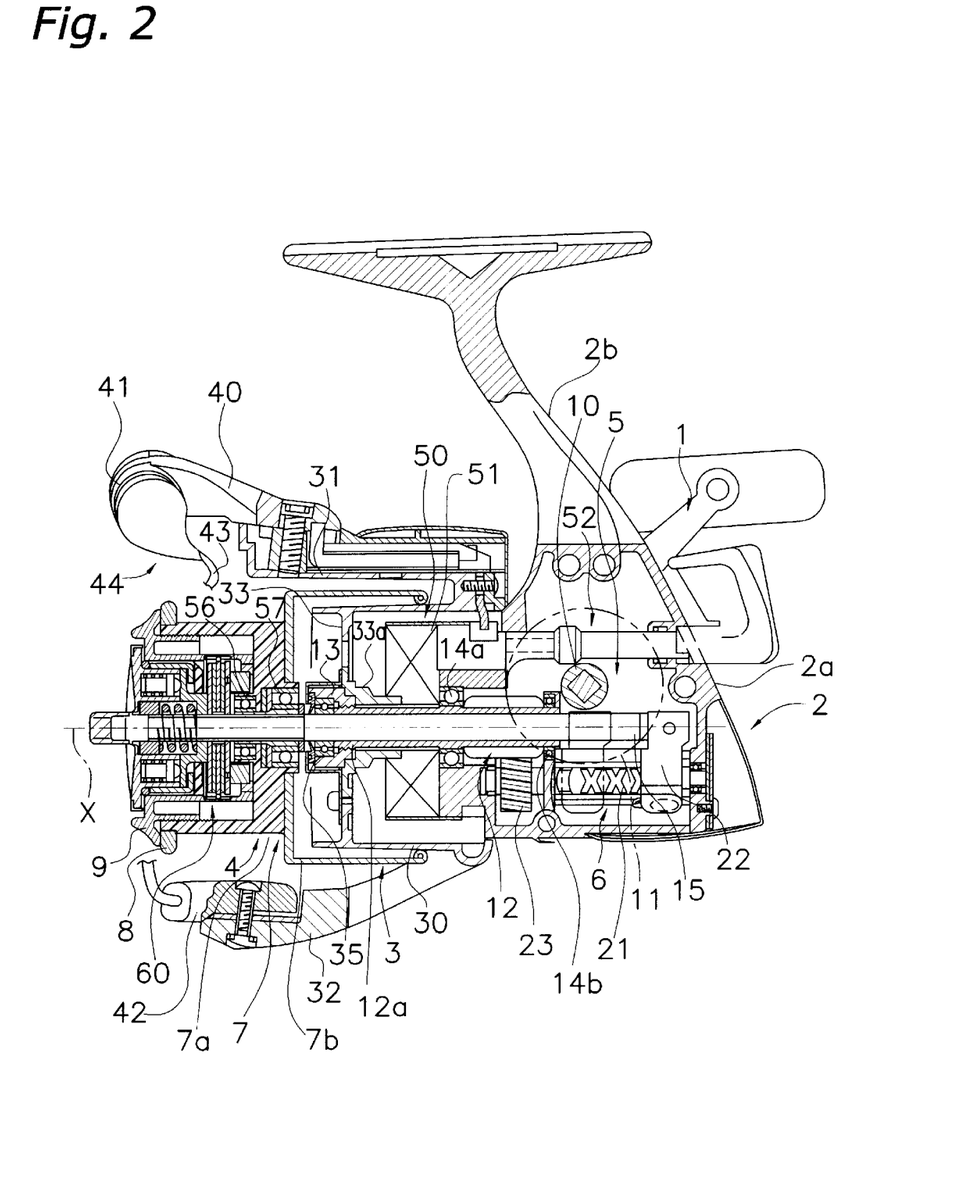
FIG. 2 is a left side, partly in section view of the spinning reel in FIG. 1.

The reel body 2 includes a reel body 2a and a rod attachment leg 2b extending diagonally upward to the front from the reel body 2a. As shown in FIG. 2, the reel body 2a has a space inside, which accommodates a rotor driving mechanism 5 and an oscillation mechanism 6. The rotor driving mechanism 5 transmits the rotation of the handle 1 to rotate the rotor 3. The oscillating mechanism 6 is for winding-on fishing line uniformly by shifting the spool 4 back and forth.

The rotor driving mechanism 5 includes a face gear 11 and a pinion gear 12. The face gear 11 rotates together with a handle shaft 10 to which the handle 1 is fixed. The pinion gear 12 meshes with the face gear 11. The pinion gear 12 is tubular. Its front portion 12a penetrates the center of the rotor 3, and is fixed with a nut 13 to the rotor 3. The middle and the rear end of the pinion gear 12 are rotatively supported by bearings 14a and 14b in the reel body 2.

The oscillating mechanism 6 shifts the spool shaft 15, which is linked to the middle portion of the spool 4 via a drag mechanism 60, reciprocatingly, thereby also shifting the spool 4 reciprocatingly. The oscillating mechanism 6 includes a threaded shaft 21, a slider 22, and an intermediate gear 23. The threaded shaft 21 is arranged below and in parallel with the spool shaft 15. The slider 22 moves back and forth along the threaded shaft 21, to the front end of which the intermediate gear 23 is fixed. The rear end of the spool shaft 15 is fixed non-rotatively to the slider 22. The intermediate gear 23 meshes with the pinion gear 12.

As shown in FIG. 2, the rotor 3 includes a cylindrical portion 30, and first and second rotor arms 31 and 32, which are disposed in opposition to one another flanking the cylindrical portion 30. The cylindrical portion 30 and the two rotor arms 31 and 32 can be made, for example, of an aluminum alloy, and are formed unitarily.

A front wall 33 is formed in the front portion of the cylindrical portion 30, and a boss portion 33a is formed at the center of the front wall 33. In the center of the boss portion 33a, a through-hole is formed, through which a front portion 12a of the pinion gear 12 and the spool shaft 15 are passed. A nut 13 is disposed at the front of the front wall 33, and a bearing 35, which rotatively supports the spool shaft 15, is arranged inside the nut 13.

A pivotable first bail support member 40 is provided to the outer peripheral side of the tip of the first (rotor arm 31. A line roller 41 for guiding fishing line onto the spool 4 is disposed at the tip of the first bail support member 40. Also, a pivotable second bail support member 42 is provided to the inner peripheral side of the tip of the second rotor arm 32.

A bail 43 made of a substantially U-shaped wire is fixed between the line roller 41 and the second bail support member 42. The first and second bail support members 40 and 42, the line roller 41, and the bail 43 constitute a bail arm 44 for guiding fishing line onto the spool 4. The bail arm 44 is pivotable between a line-guiding posture shown in FIG. 2 and a reversed line-release posture.

A reverse rotation check mechanism 50 for prohibiting/ allowing reverse rotation of the rotor 3 is provided inside the cylindrical portion 30 of the rotor 3. As shown in FIG. 2, this reverse rotation check mechanism 50 has a roller-type one-way clutch 51 with a freely rotating inner ring and a switching mechanism 52 for switching the one-way clutch 51 between an operational state (in which reverse rotation is not possible) and a non-operational state (in which reverse rotation is possible).

The spool 4 is arranged between the first rotor arm 31 and the second rotor arm 32 of the rotor 3, and is disposed at the end of the spool shaft 15, with the drag mechanism 60 interposed between the spool shaft 15 and the spool 4.

The spool 4 includes a spool body 7, a front flange portion 8, and a front-flange fixing member 9. The spool body 7 has a tubular bobbin trunk 7a, circumferentially onto whose outer circumferential surface 7h fishing line is wound, and a larger diameter tubular skirt 7b attached to the rear end of the bobbin trunk 7a. The front flange portion 8 is provided at the front end of the bobbin trunk 7a. The front-flange fixing member 9 fastens the front flange portion 8 to the spool body 7. The spool body 7 is supported by two bearings 56 and 57 and can rotate around the spool shaft 15. The front flange portion 8 is provided at the front end of the bobbin trunk 7a. The front-flange fixing member 9 fastens the front flange portion 8 to the spool body 7. The spool body 7 is supported by two bearings 56 and 57 and can rotate around the spool shaft 15.

Figure 3:
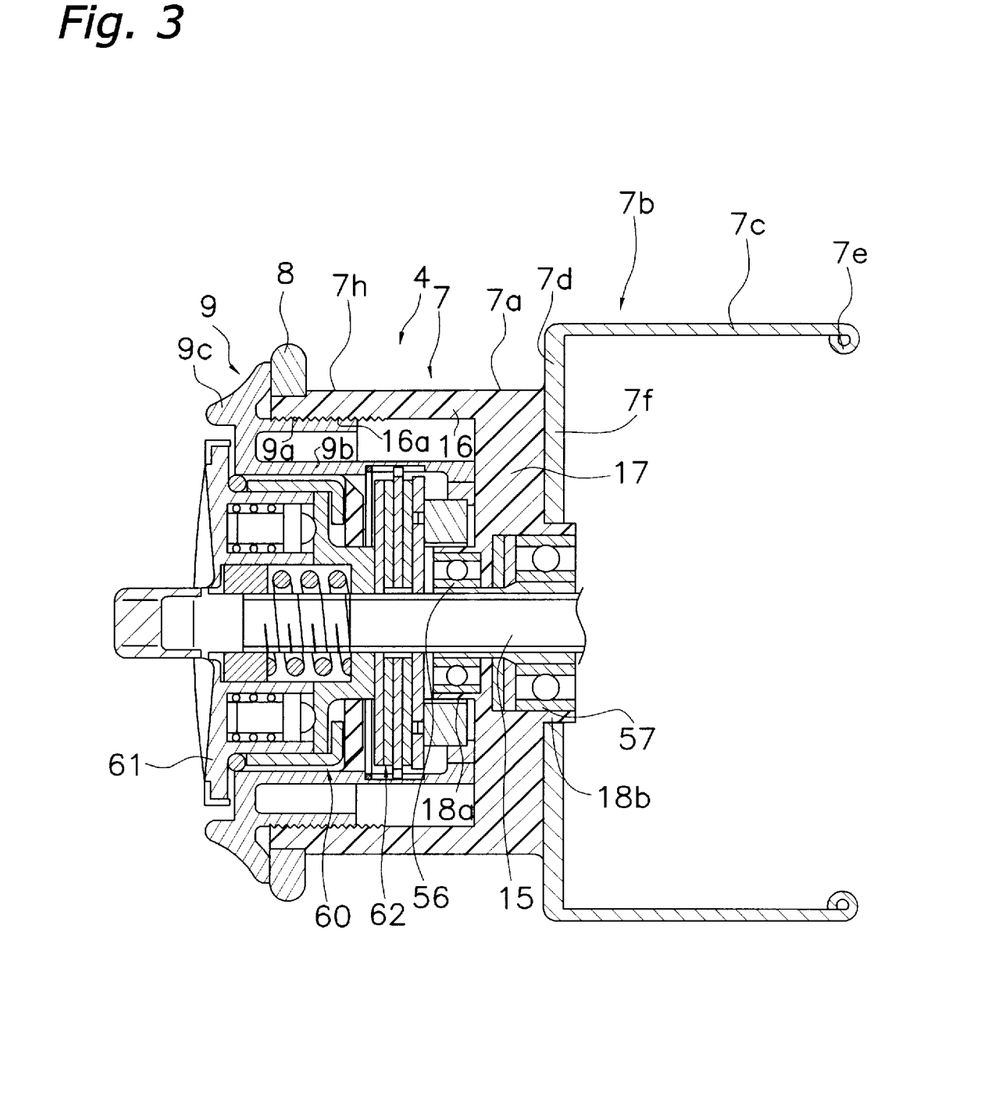
FIG. 3 is an enlarged sectional view of the spool from the spinning reel in FIG. 2.

As shown in FIG. 3, the bobbin trunk 7a includes a relatively bulkier bobbin portion 16 made of a synthetic resin polymer, a base portion 17 formed unitarily on the inner peripheral side of the bobbin portion 16, and a pair of boss portions 18a and 18b formed on the inner peripheral side of the base portion 17. As shown in FIG. 1, a plurality of axially spaced annular grooves is formed in the outer peripheral surface of the bobbin portion 16. Female threads 16a for attaching the front-flange fixing member 9 are formed on the inner peripheral surface of the bobbin portion 16. The two bearings 56 and 57 are provided inside the boss portions 18a and 18b. The outer peripheral side of the bobbin portion 16 is plated to make it appear metal-like.

The skirt 7b is made of an aluminum alloy, and has a tubular portion 7c covering the cylindrical portion 30 of the rotor 3, and a rear flange portion 7d connecting the tubular portion 7c with the bobbin trunk 7a. The tubular portion 7c and the rear flange portion 7d are formed unitarily by press-working, making them thinner, i.e., so that they are of relatively less bulk. A folded (beaded) portion 7e that is bent over onto the inner peripheral side in the rear end of the tubular portion 7c is formed by a curling process. The rear flange portion 7d has an inner margin 7f that extends inner marginally of the bobbin trunk 7a. The inner margin 7f and the base portion 17 of the bobbin trunk 7a are bonded together, for example by gluing.

The front flange portion 8 is made of a stainless alloy and is disk-shaped. Alternatively, front flange portion 8 may be a ceramic manufacture as is conventional. The front flange portion 8 is sandwiched between the bobbin trunk 7a and the front-flange fixing member 9, which is screwed into the female threads 16a in the inner peripheral surface of the bobbin trunk 7a.

The front-flange fixing member 9 includes a male-threaded tubular portion 9a, a tubular drag-housing portion 9b, and an abutment 9c. The male threaded portion 9a is screwed into the female threads 16a formed in the inner peripheral surface of the spool body 7. The drag-housing portion 9b is formed unitarily with, and to the inner peripheral side of, the male threaded portion 9a, and has an interior space for accommodating a plurality drag plates 62 (explained below) of the drag mechanism 60. The abutment 9c is provided at the front end of the male threaded portion 9a for abutting against the front flange 8.

The drag mechanism 60, fitted between the spool 4 and the spool shaft 15, is a mechanism for applying drag force to the spool 4. The drag mechanism 60 includes a knob 61 for manually adjusting drag force, and a plurality of drag plates 62 that are pressed by the knob 61 against the spool 4.

In this spool 4, the bobbin trunk 7a is made of a thicker synthetic resin polymer, and the skirt 7b is made of a thinner aluminum alloy. Furthermore, the tubular portion 7c and the rear flange portion 7d of the skirt 7b are formed unitarily by press-working. Thus the bobbin trunk 7a is formed with strength-sustaining bulk, yet because the skirt 7b is formed thin by press-working it can be made lighter. Moreover, although the skirt 7b is made thinner, forming its tubular and rear flange portions 7c and 7d unitarily maintains sufficient strength.

Modification of the First Embodiment (a) In the first embodiment, the skirt 7b is made of an aluminum alloy, but the embodiment is not thereby limited, and the skirt 7b may also be formed from stainless alloys, titanium alloys or magnesium alloys.

(b) In the first embodiment, the bobbin trunk 7a is made of a synthetic resin, but the embodiment is not thereby limited; the bobbin trunk 7a may also be formed by any of press-working, die casting, or forging metals such as aluminum alloys, titanium alloys, stainless alloys or magnesium alloys.

Figure 4:
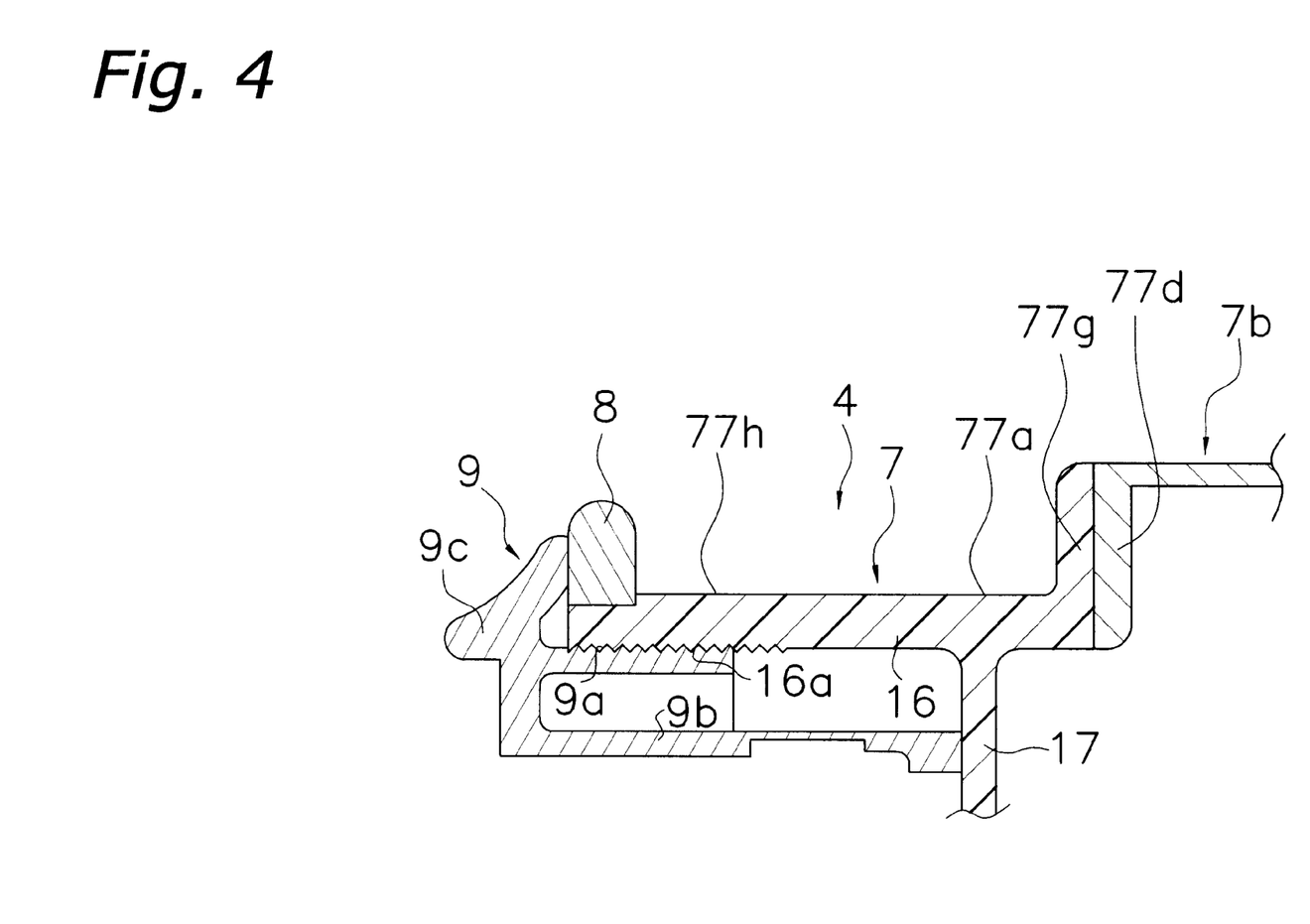
FIG. 4 is an enlarged fragmentary sectional view illustrating a detail of a spool corresponding to that as depicted in FIG. 3, in a modification of the first embodiment.

(c) As shown in FIG. 4, the spool body 7 may further be provided with an outer margin 77g extending outward from the rear end of the outer circumferential surface 77h of bobbin trunk 77a onto which the fishing line is wound, and the outer margin 77g and the rear flange portion 77d may we bonded.

Figure 5:
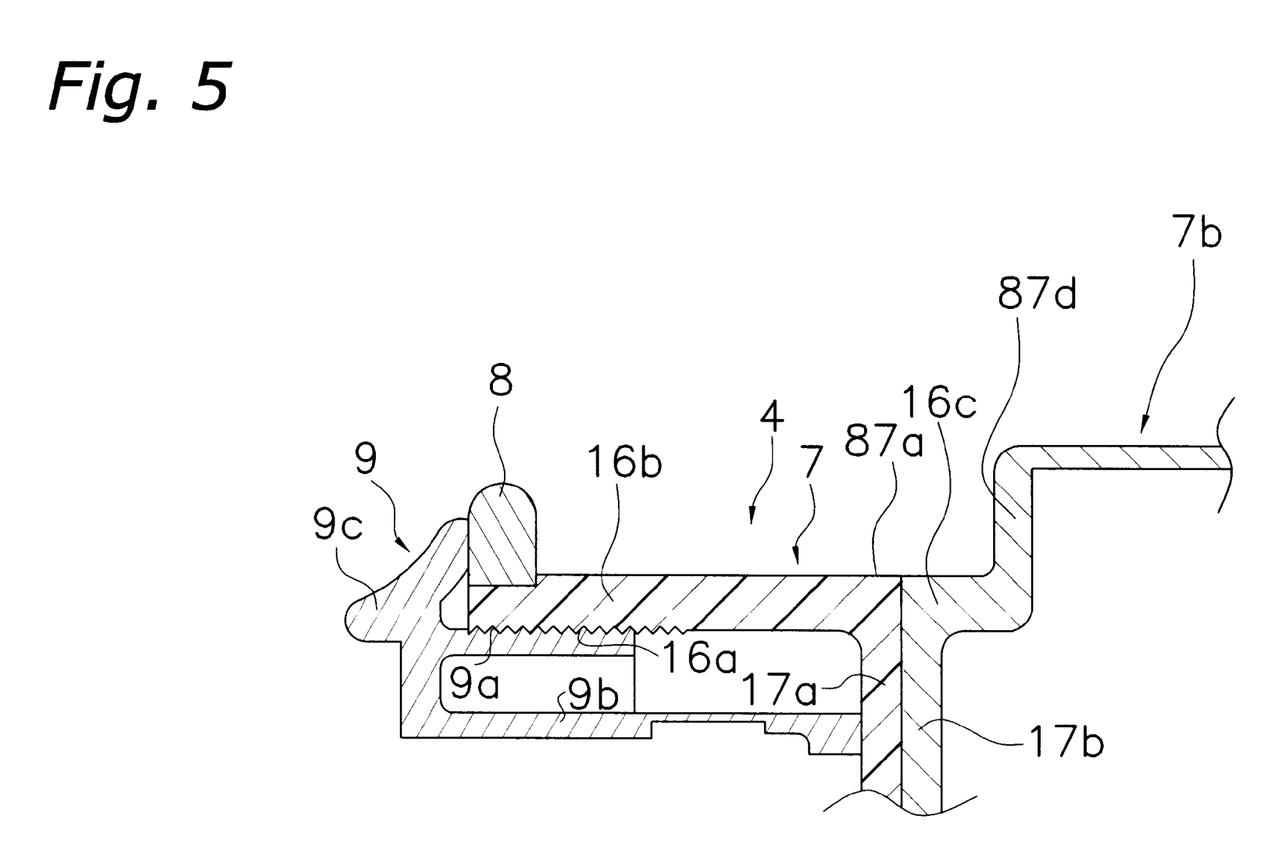
FIG. 5 is an enlarged fragmentary sectional view corresponding to FIG. 4 of yet another modification.

(d) As shown in FIG. 5, the bobbin trunk 87a may be composed of a first bobbin section 16b made of a synthetic resin polymer, and a second bobbin section 16c of aluminum alloy manufacture, formed unitarily with the rear flange portion 87d by press-working and processed so as to be diametrically coincident with the first bobbin section 16b. And a first base portion 17a formed on the inner peripheral side of the first bobbin section 16b may be bonded to a second base portion 17b of the second bobbin section 16c. The first bobbin section 16b and the second bobbin section 16c may each also be formed from metal; and the first base portion 17a and the second base portion 17b may be bonded by welding.

Figure 6:
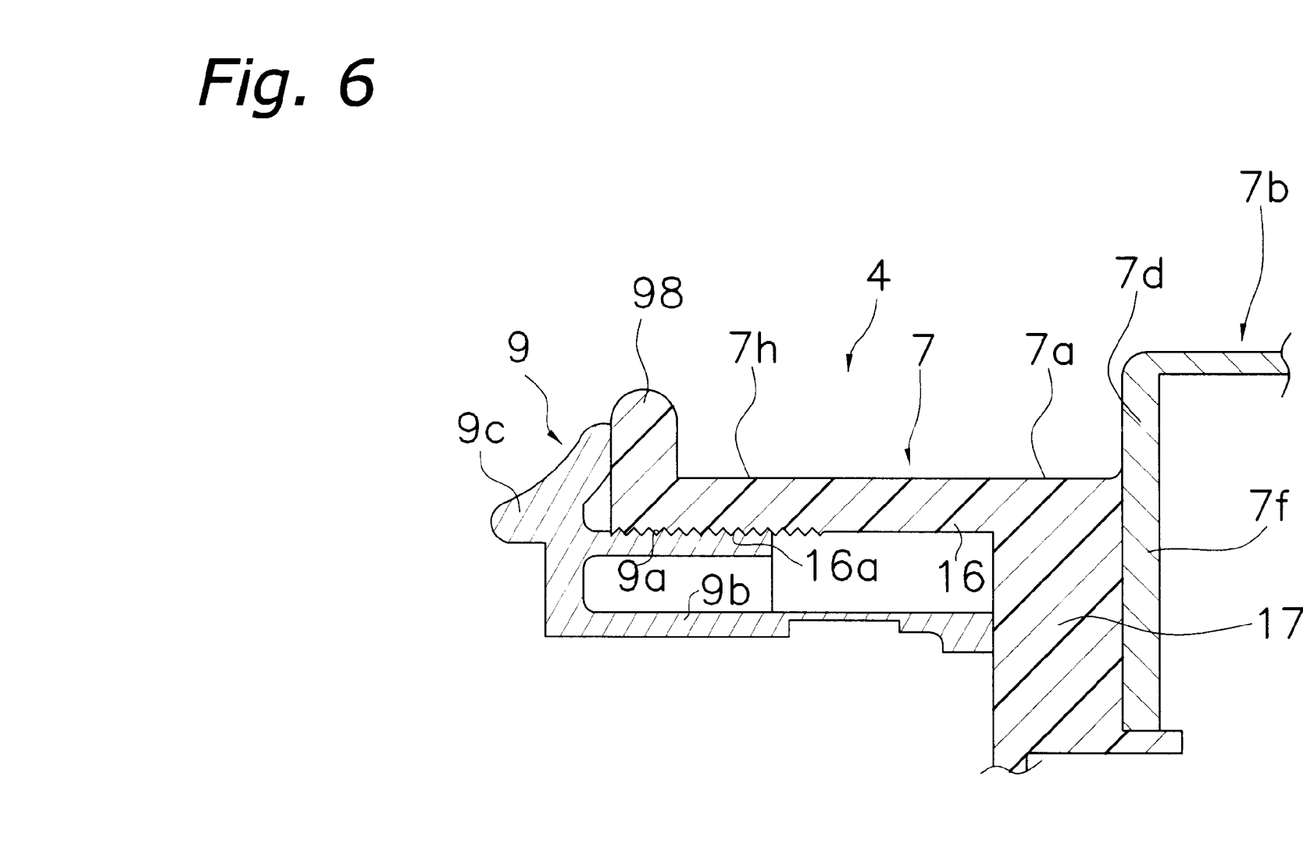
FIG. 6 is an enlarged fragmentary sectional view corresponding to FIG. 4 of yet another modification.

(e) In the first embodiment, the front flange portion 8 is attached to the bobbin trunk 7a as a separate piece, but the front flange portion 98 and the bobbin trunk 7a may be-formed unitarily, as shown in FIG. 6.

Figure 7:
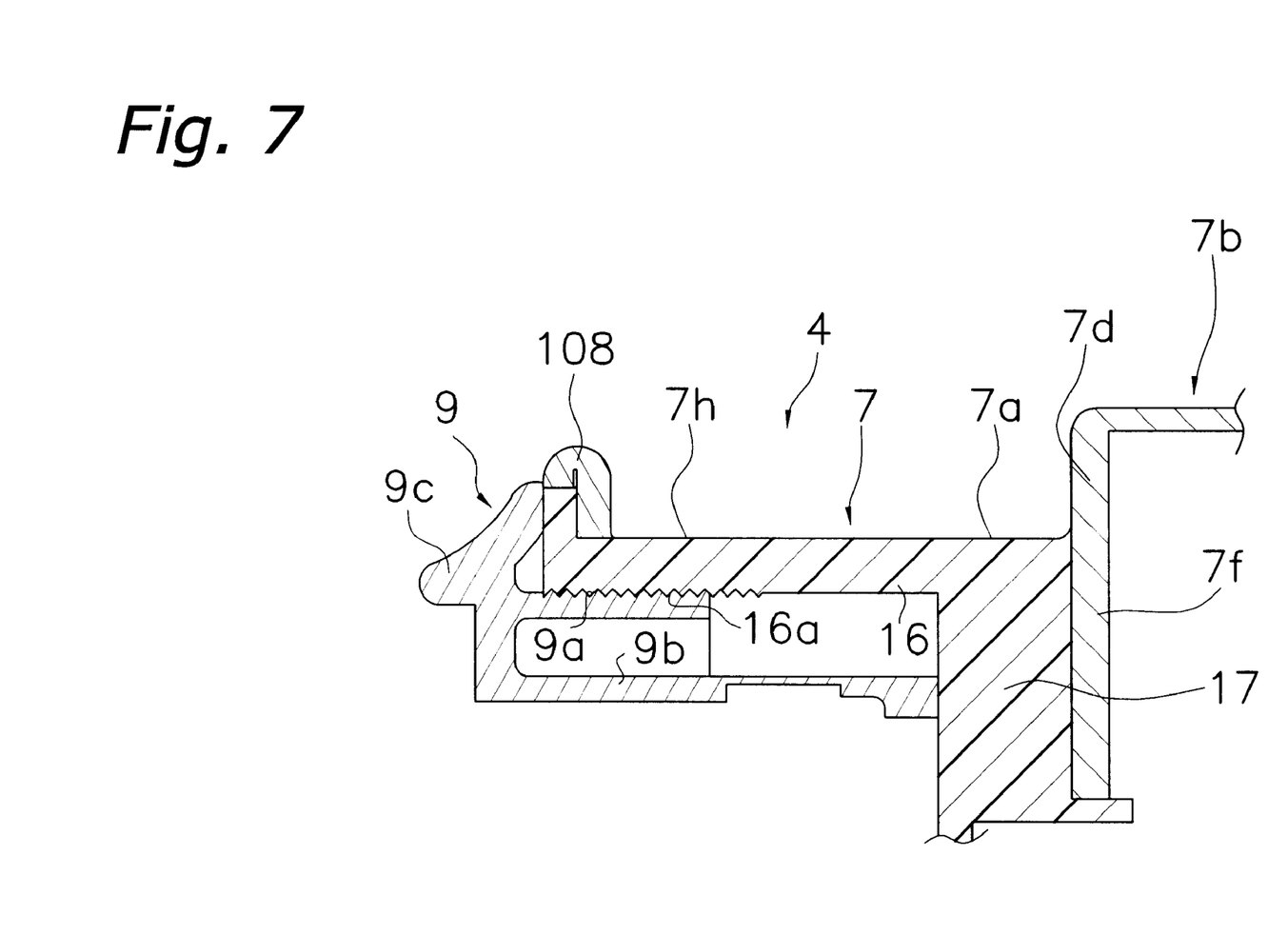
FIG. 7 is an enlarged fragmentary sectional view corresponding to FIG. 4 of yet another modification.

Furthermore, a curling-worked flange portion 108 may be attached to the bobbin trunk 7a, as shown in FIG. 7.

Figure 8:
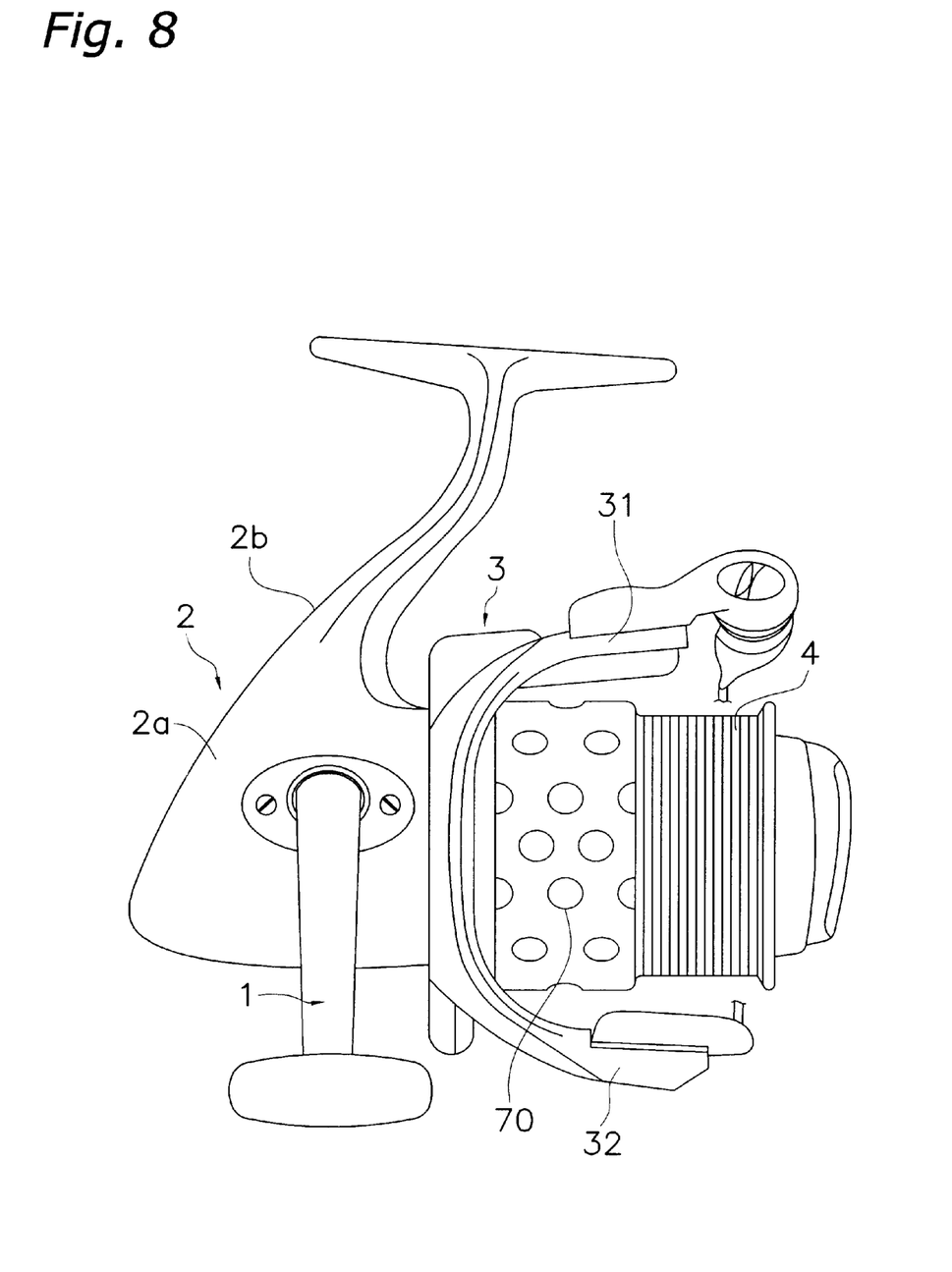
FIG. 8 is a view corresponding to FIG. 1 of yet another modification.

(f) As shown in FIG. 8, a plurality of through-holes 70 may be formed by press-working through the outer peripheral surface of the skirt 7b.

Second Embodiment

A second embodiment of the present invention will be explained in the following. Explanation of the configuration that except for the spool is the same as in the first embodiment is omitted in the following.

Figure 9:
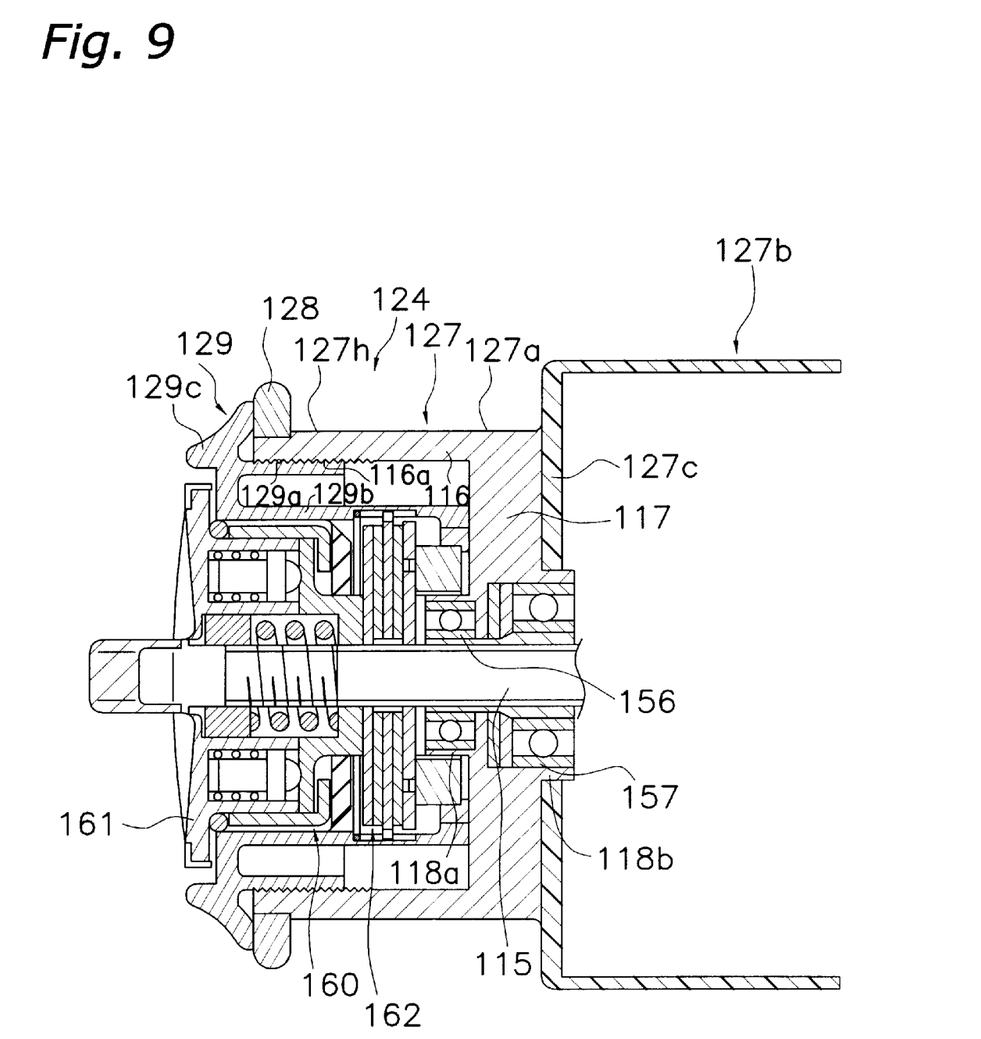
FIG. 9 is a view corresponding to FIG. 3 of a second embodiment.

As shown in FIG. 9, a spool 124 in accordance with a second embodiment of the present invention includes a spool body 127, a front flange portion 128, and a front-flange fixing member 129. The spool body 127 has a tubular bobbin trunk 127a1 circumferentially onto whose outer circumferential surface 127h fishing line is wound, and a larger diameter tubular skirt 127b attached to the rear end of the bobbin trunk 127a. The front flange portion 128 is provided on the front end of the bobbin trunk 127a. The front-flange fixing member 129 fastens the front flange portion 128 to the spool body 127. The spool body 127 is supported by two bearings 156 and 157 for rotation about the spool shaft 115.

The bobbin trunk 127a includes a bobbin portion 116 made of an aluminum alloy, a base portion 117 formed unitarily on the inner peripheral side of the bobbin portion 116, and a pair of boss portions 118a and 118b formed on an inner peripheral side of the base portion 117. A plurality of axially spaced annular grooves is formed in the outer peripheral surface of the bobbin portion 116. A female threaded portion 116a for mounting the front-flange fixing member 9 is formed in the inner peripheral surface of the bobbin portion 116. The two bearings 156 and 157 are provided inside the boss portions 118a and 118b.

The skirt 127b is made of a synthetic resin and covers the cylindrical portion 30 of the rotor 3. An annular rear flange portion 127c is formed at the front end of the skirt 127b. The rear flange portion 127c of the skirt 127b and the base portion 117 of the bobbin trunk 127a are fastened to each other by gluing, for example. The outer peripheral side of the skirt 127b is plated to make it look metal-like.

The front flange portion 128 is made of a stainless alloy and is disk-shaped. The front flange portion 128 is sandwiched between the bobbin trunk 127a and the front-flange fixing member 129, which is screwed into the female threaded portion 116a in the inner peripheral surface of the bobbin trunk 127a.

The front-flange fixing member 129 includes a tubular threaded male portion 129a, a tubular drag-housing portion 129b, and an abutment 129c. The male threaded portion is screwed into the female threaded portion 16a formed in the inner peripheral surface of the spool body 127. The drag-housing portion 129b is formed unitarily with and on the inner peripheral side of the male threaded portion 129a, and has an interior space, for accommodating the plurality of drag plates 62 of the drag mechanism 60. The abutment 129c is provided at the front end of the male threaded portion 129a so that the front flange 128 can be abutted against it.

In this spool 124, the skirt 127b is provided with a base portion 127c. The strength of the skirt 127b is maintained sufficiently high, because this base portion 127c improves the radial strength of the skirt 127b.

Modification of the Second Embodiment (a) In the second embodiment, the bobbin trunk 127a is made of an aluminum alloy, but the embodiment is not thereby limited, and the bobbin trunk 127a may also be formed from stainless alloys, titanium alloys or magnesium alloys.

(b) In the second embodiment, the skirt 127b is made of a synthetic resin, but the embodiment is not thereby limited; the skirt 127b may also be formed by any of press-working, die casting, or forging metals such as aluminum alloys, titanium alloys, stainless alloys or magnesium alloys.

Figure 10:
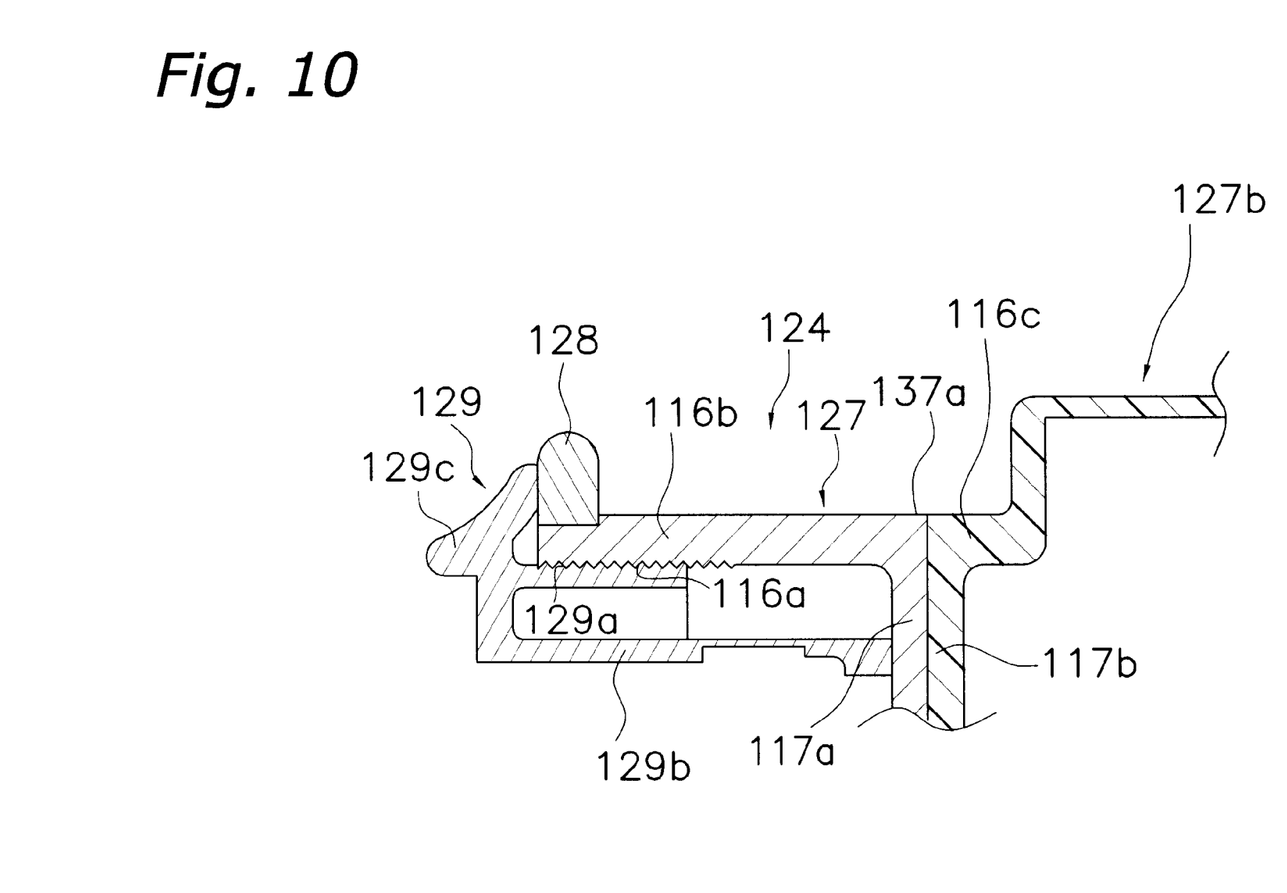
FIG. 10 is an enlarged fragmentary sectional view corresponding to FIG. 4 in a modification of the second embodiment.

(c) As shown in FIG. 10, the bobbin trunk 127a may be composed of a first bobbin section 116b made of an aluminum alloy, and a second bobbin section 116c made of a synthetic resin, which is worked so as to have the same diameter as the first bobbin portion 116b, and to bond a first base portion 117a formed on the inner peripheral side of the first bobbin section 116b to a second base section 117b of the second bobbin portion 116c. Both the first bobbin portion 116b and the second bobbin portion 116c may be made of metal, and the first base portion 117a and the second base portion 117b may be welded together.

In accordance with an aspect of the present invention, the skirt is provided with a rear flange portion, so that the strength of the skirt is maintained sufficiently high.

In accordance with another aspect of the present invention, the tubular portion of the skirt and the rear flange portion are formed unitarily by press-working, so that the skirt is not affected by the bobbin trunk's specifications. This enables the skirt to be made thin to achieve lighter weight, while maintaining its strength. Furthermore, the bobbin trunk can be formed with the bulk necessary to maintain its strength at the same time the skirt is made lighter in weight.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A spinning reel spool for use in a spinning reel, said spinning reel spool being coupled to a reel body so as to be reciproactive therewith, said spinning reel spool comprising:
   a bobbin truck for carrying fishing line wound on its outer circumferential surface, said bobbin truck having a first end surface that is substantially perpendicular to the spool shaft; and
   a skirt having a tubular portion and a rear portion larger in outer diameter than said outer circumferential surface of said bobbin trunk, said rear flange portion being formed unitarily with said tubular portion and having a second end surface that is substantially perpendicular to the spool shaft and larger in diameter than said outer circumferential surface of said bobbin trunk, said second end surface being attached to said first end surface.

2. A spinning reel spool as set forth in claim 1, wherein said skirt is a synthetic resin polymer manufacture.

3. A spinning reel spool as set forth in claim 2, wherein material for said synthetic resin polymer manufacture is surface-finished.

4. A spinning reel spool as set forth in claim 1, wherein said skirt is manufactured of metal.

5. A spinning reel spool as set forth in claim 4, wherein said skirt is formed from at least one selected from aluminum alloy, stainless alloy, titanium alloy and magnesium alloy.

6. A spinning reel spool as set forth in claim 5, wherein said skirt is formed by at least one selected from press-working, die casting and forging.

7. A spinning reel spool as set forth in claim 6, wherein said tubular portion of said skirt and said rear flange portion are formed unitarily by press-working.

8. A spinning reel spool as set forth in claim 4, wherein said skirt further has a folded portion bent over marginally inward in the rear end of said tubular portion.

9. A spinning reel spool as set forth in claim 8, wherein said folded portion is formed by a curling process.

10. A spinning reel spool as set forth in claim 4, wherein said skirt further has through-holes formed by press-working through its outer peripheral surface.

11. A spinning reel spool as set forth in claim 1, wherein said bobbin trunk is manufactured of metal.

12. A spinning reel spool as set forth in claim 11, wherein said bobbin trunk is formed from at least one selected from aluminum alloy, stainless alloy, titanium ralloy and magnesium alloy.

13. A spinning reel spool as set forth in claim 12, wherein said bobbin trunk is formed by at least one selected from press-working, die casting and forging.

14. A spinning reel spool as set forth in claim 1, wherein said bobbin trunk is a synthetic resin polymer manufacture.

15. A spinning reel spool as set forth in claim 1, further comprising a front flange portion larger in outer diameter than said bobbin trunk is outer diametrically large, and provided front endwise on said bobbin trunk.

16. A spinning reel spool as set forth in claim 15, wherein said front flange portion is formed unitarily with said bobbin trunk.

17. A spinning reel spool as set forth in claim 15, wherein said front flange portion is attached to said bobbin trunk as a separate piece.

18. A spinning reel spool as set forth in claim 15, wherein said front flange portion is formed from at least one selected from aluminum alloy, stainless alloy, titanium alloy and magnesium alloy.

19. A spinning reel spool as set forth in claim 18, wherein said front flange portion is curling-worked.

20. A spinning reel spool as set forth in claim 1, wherein said bobbin trunk has a base portion, a rear surface of said base portion forming said first circumferential surface.

21. A spinning reel spool as set forth in claim 20, wherein said base portion of said bobbin trunk is for bonding with said second circumferential surface of said rear flange portion on said skirt.

22. A spinning reel spool reciprocative with respect to the reel body, said spinning reel spool comprising:
   a bobbin trunk for carrying fishing line wound outer circumferentially thereon; and
   a skirt having a tubular portion larger in outer diameter than said bobbin trunk, and a rear flange portion formed unitarily with said tubular portion and attached rear endwise to said bobbin trunk,
   wherein said bobbin trunk comprises:
      a first bobbin section having a first base portion; and
      a tubular second bobbin section formed unitarily with said skirt, diametrically coincident with said first bobbin portion.

23. A spinning reel spool as set forth in claim 22, wherein said second bobbin section has a second base portion.

24. A spinning reel spool as set forth in claim 23, wherein said first base portion is for bonding with said second base portion.

25. A spinning reel spool for use in a spinning reel, said spinning reel spool being rotatable about a spool shaft and reciprocative with respect to a reel body, said spinning reel spool comprising:
   a bobbin trunk for carrying fishing line wound outer circumferentially thereon, said bobbin trunk being formed by one of press-working and die-casting; and
   a skirt having a tubular portion larger in outer diameter than said bobbin trunk and a rear flange portion formed unitarily with said tubular portion and attached to a rear end of said bobbin trunk, said skirt being formed by the other of press-working and die-casting.

26. A spinning reels spool as set forth in claim 25 wherein said skirt is formed from at least one selected from aluminum alloy, stainless alloy, titanium alloy and magnesium alloy.

27. A spinning reel spool as set forth in claim 26 wherein said skirt is formed by press-working.

28. A spinning reel spool as set forth in claim 25 wherein said rear flange portion further has an inner margin extending marginally inward of said bobbin trunk.

29. A spinning reel spool as set forth in claim 25 wherein said bobbin trunk further has an outer margin extending marginally outward from the rear end of said bobbin trunk.

30. A spinning reel spool as set forth in claim 29 wherein said outer margin is for bonding with said rear flange portion of said skirt.

\* \* \* \* \*